3,644,437
Patented Feb. 22, 1972

1

3,644,437
17α - ALKYNYL - 17β-ALKYLGON-13-ENES, PROCESSES THEREFOR AND PRODUCTS THEREFROM
Reinhardt P. Stein, Conshohocken, and Herchel Smith, Bryn Mawr, Pa., assignors to American Home Products Corporation, New York, N.Y.
No Drawing. Filed Aug. 22, 1969, Ser. No. 852,448
Int. Cl. C07c *169/08, 169/22*
U.S. Cl. 260—397.3       21 Claims

ABSTRACT OF THE DISCLOSURE

Compounds of the 17α-(lower) alkynyl-17β-(lower) alkylgon - 13 - ene series, optionally substituted at C–16 with (lower)alkyl (I) are provided by treating the corresponding 17α - (lower)alkynyl - 13β - (lower)alkylgon-17β-ols (II) with a solution of phosphorus oxychloride in dimethylformamide at elevated temperatures for relatively short reaction times. Compounds (I) of the gona-1,3,5(10)-triene series and the esters of the gona-5-en-3-ol series are useful to prepare progestationally and antiandrogenically active compounds by known methods.

---

This invention is concerned generally with novel steroid compounds and with processes for preparing and using the same and with useful intermediates therefor. More particularly, it relates to hormonally-active steroids of the 17α-(lower)alkynyl-17β-(lower)alkylgon-13 - ene series, and 16-(lower)alkylanalogs thereof, and especially to the 17-polycarbon(lower)alkyl family thereof, to processes of producing them and to novel and valuable products prepared therefrom. Some of the products of the instant process have been used as intermediates in the preparation of highly active anti-microbial and anti-fungal agents. In addition to their above-mentioned utility for the preparation of compounds with activity as progestagens and anti-androgens, subsequent catalytic hydrogenation of the 17α-alkynyl group provides 18 - nor-17,17-dialkylgon-13-ene steroids of use in fertility control.

DESCRIPTION OF THE INVENTION

The invention contemplates, in essence, a process for the preparation of a compound of the 17α-(lower)alkynyl-17β-(lower)alkylgon-13-ene series which comprises heating the corresponding 17α - (lower)alkynyl-13β-(lower) alkylgonan-17β-ol with a solution of phosphorus oxychloride in dimethylformamide until formation of said gon-13-ene is substantially complete. This aspect can be depicted as follows:

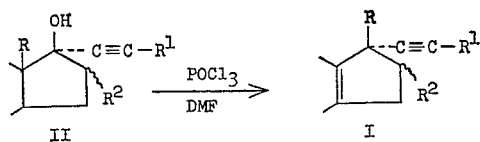

wherein

R is (lower)alkyl;
R¹ is hydrogen or alkyl from 1 to 4 carbon atoms; and
R² is hydrogen or (lower)alkyl;

the symbol (⸱) designating α- or β-configuration, and "DMF" is dimethylformamide.

Special mention is made of a number of valuable embodiments of the instant invention. These are:
A process as first above defined, wherein said heating is carried out at a temperature from about 75° C. to about 100° C. for from about 5 to about 30 minutes; this embodiment provides especially good yields of pure product; and

2

A process as first above defined, wherein said gon-13-ene is of Formula Ia

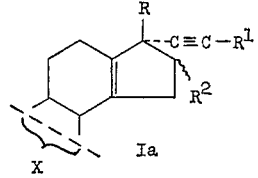

wherein

R is (lower)alkyl;
R¹ is hydrogen or alkyl of from 1 to 4 carbon atoms;
R² is hydrogen or (lower)alkyl;
X is a divalent radical selected from

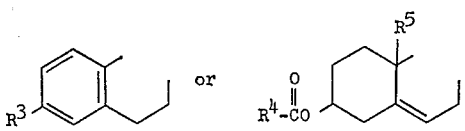

wherein

R³ is hydrogen, (lower)alkoxy or (lower)alkanoyloxy;
R⁴ is (lower)alkyl;
R₅ is hydrogen or methyl; and the symbol (⸱) designates α- or β-configuration;
and wherein said gonan-17β-ol is of Formula IIa:

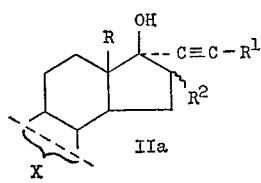

wherein R, R¹, R² and X are as hereinabove defined.

Several embodiments of the preferred process aspect are:
A process as next above defined, wherein dl-17β-ethyl-17α-ethynyl-3-methoxygona-1,3,5(10),13-tetraene is prepared from dl-13-ethyl-17α-ethynyl-3-methoxygona-1,3,5 (10)-trien-17β-ol;
A process as first above defined, wherein dl-17β-ethyl-17α-ethynylgona-5,13-dien-3β-ol, acetate is prepared from dl-13-ethyl-17α-ethynylgon-5-en-3β,17β-diol, 3-acetate;
A process as first above defined, including the step of catalytically hydrogenating said 17α-(lower)alkynylgon-13-ene to produce the corresponding 17α-(lower)alkenyl- or (lower)alkylgon-13-ene;
A process as next above defined, wherein dl-17,17-diethyl-3-methoxygona-1,3,5(10),13 - tetraene is produced from dl-17β-ethyl-17α-ethynyl-3-methoxygona - 1,3,5(10), 13-tetraene;
A process as first above defined, including the step of hydrolyzing in the presence of base, e.g., an alkali metal or alkaline earth metal hyroxide, carbonate, bicarbonate or (lower)alkoxide, the ester function in a 3-(lower)alkanoyloxygon-5,13-diene, or a 3-formyloxygona-1,3,5(10),13-tetraene compound of Formula Ia, to produce the corresponding 3-ol compound;
A process as next above defined, wherein dl-17β-ethyl-17α-ethynylgona-5,13-dien-3β-ol is produced by heating dl-17β-ethyl-17α-ethynylgona-5,13-dien-3β-ol, acetate with potassium hydroxide in methanol;
A process defined immediately preceding the next above, including the step of oxidizing said 3-ol to produce a compound of the 17β-(lower)alkyl-17α-(lower)alkynyl-((or -vinyl or -(lower)alkyl))gona-4,13-dien-3-one series;
A process as next above defined, wherein dl-17β-ethyl-17α-ethynylgona-4,13-dien-3-one is produced by heating dl-17β-ethyl-17α-ethynylgona-5,13-dien-3β-ol with aluminum isopropoxide and a ketone, e.g., acetone, methyl ethylketone, cyclohexanone and the like;

A process defined immediately preceding the next above, including the step of reacting said gona-4,13-dien-3-one with methyl magnesium chloride, bromide or iodide to produce the corresponding 5-methylgon-13-ene-3-one; and A process as next above defined, wherein dl-17β-ethyl-17α-ethynyl-5β-methylgon-13-en-3-one is produced by reacting dl-17β-ethyl-17α-ethynylgona-4,13-dien-3-one with methyl magnesium bromide.

As will be obvious to those skilled in the art, several indirect reactions may result from the conditions of the process if the substrate (II) has other reactive functions in the molecule. For other hydroxyl functions in the steroidal molecule may themselves undergo dehydration if the tendency for dehydration is great. If, however, other hydroxyl groups are stable to dehydration, the reaction conditions of the process will result in the formation of the corresponding formate ester of these hydroxyl groups. The reaction conditions resemble those of the well known "Vilsmeier reaction" and as such undesired reactions with certain functional groups may occur. Because of this, obviously, those skilled in the art will not carry out the reaction using steroid substrates containing the following functions: enol ethers, enol esters, unsaturated ketones, and the like. In fact, in the preferred embodiments, (Ia), the best substrates for the process are considered to be gona-1,3,5(10)-trienes and the esters of gona-5-en-3-ols (IIa).

As will also be obvious to those skilled in the art, the compounds formed in the process may be converted by known methods to other related novel compounds. Such subsequent conversions and novel and useful compounds prepared thereby are also contemplated to be embodiments of the invention. Thus, for example, the following conversions are noted:

(1) Catalytic hydrogenation of the 17α-ethynyl groups to vinyl or further to ethyl.
(2) Birch reduction and subsequent hydrolyses of aromatic A-rings in compounds obtained from (1).
(3) Base hydrolysis of the ester function in 3-acyloxygon-5-enes to the corresponding 3-ols followed by oxidation to give the class of compounds known as 17β-alkyl-17α-ethynyl- (or vinyl- or ethyl-)-gona-4,13-dien-3-ones.
(4) The addition of methyl Grignard reagent to the above gona-4,13-dien-3-ones to give the corresponding 5-methylgon-13-en-3-ones.
(5) Addition reactions of the C₁₃ double bond, thereby allowing the functionalization of the C₁₃ and C₁₄ positions of the steroid nucleus. It is of special note that steps (1) and (2) above can be utilized to give compounds with antiesterogenic and antiandrogenic activities such as 17α-alkyl-17β-polycarbonalkylgona-4,13-dien-3-ones, e.g., 17,17-diethylgona-4,13-dien-3-one.

In addition to the process of the instant invention, there are contemplated a number of valuable products prepared directly therefrom and, those prepared by subsequent reactions. These are:

A compound of Formula Ia:

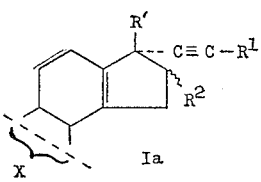

wherein

R′ is polycarbon(lower)alkyl;
R¹ is hydrogen or alkyl of from 1 to 4 carbon atoms;
R² is hydrogen or (lower)alkyl;

X is a divalent radical selected from

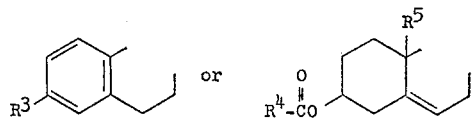

wherein

R³ is hydrogen, hydroxy, (lower)alkoxy or (lower)-alkanoyloxy and
R⁴ is (lower)alkyl;
R⁵ is hydrogen or methyl; and the symbol (ξ) designates α- or β-configuration.

Special mention is made of particularly valuable compounds included within the scope of the above-identified genus. These are the compounds:

dl-17β-ethyl-17α-ethynyl - 3-methoxygona - 1,3,5(10), 13-tetraene; and dl-17β-ethyl-17α-ethynylgona-5,13-dien-3β-ol, acetate; and dl-17β-ethyl-17α-ethynylgona-5,13-dien-3β-ol.

In addition mention is made of other ultimate compounds, which are:

Compounds of the 17α-alkynyl-17β-polycarbon(lower)alkylgona-4,13-dien-3-one series of Formula III:

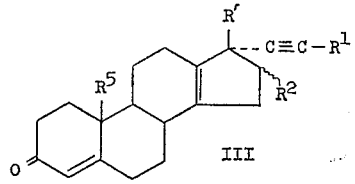

wherein R′, R¹, R² and R⁵ are as hereinabove defined, and especially dl-17β-ethyl-17α-ethynylgona-4,13-dien-3-one;

Compounds of 17α-alkynyl-17β-polycarbon(lower)alkyl-5β-methylgon-13-en-3-one series of Formula IV:

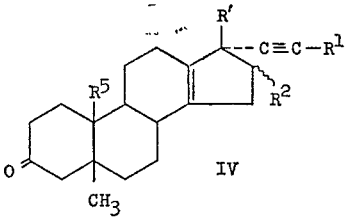

wherein R′, R¹, R² and R⁵ are as hereinabove defined, and especially dl-17β-ethyl-17α-ethynyl-5β-methylgon-13-en-3-one; and Compounds of the 17α-(lower)alkyl-17β-polycarbon(lower)alkylgona-1,3,5(10),13-tetraene series of Formula V:

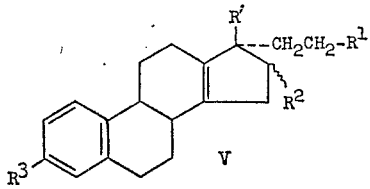

wherein R′, R¹, R² and R³ are as hereinabove defined, and especially dl-17,17-diethyl-3-methoxygona-1,3,5(10), 13-tetraene.

Compounds of Formulae III, IV and V are valuable intermediates in the preparation of compounds with progestational and antiandrogenic effects. Compounds of Formulae III and IV are progestational agents, per se. Compounds of Formula V are useful in fertility control.

When used herein and in the appended claims, the term "(lower)alkyl" includes hydrocarbon chains of from about 1 to about 6 carbon atoms, both straight chain and branched, illustrative members of which are methyl, ethyl, n-propyl, i-propyl, n-butyl, s-butyl, t-butyl, n-pentyl, isopentyl, hexyl and the like. The term "polycarbon alkyl" contemplates polycarbon(lower)alkyl, containing from about 2 to about 6 carbon atoms and includes groups illustrated above but excluding the methyl group; the ethyl group is preferred. The term "(lower)alkanoyloxy" contemplates groups of the formula (lower)alkyl—$CO_2$—, wherein "(lower)alkyl" is above defined, and the formyl group. The term "(lower)alkoxy)" includes straight and branched chain groups of from about 1 to about 6 carbon atoms, such as methoxy, ethoxy, n-propoxy, i-propoxy, n-hexoxy and the like.

Starting materials for all of the above-mentioned compounds, i.e., 17α-alkynyl-13-(lower)alkylgonan-17β-ols, e.g., those of

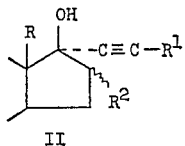

wherein R, $R^1$ and $R^2$ are as above defined are readily available or can be prepared by techniques well known by those skilled in the art. A useful general means comprises reacting a suitably substituted 17-ketogonane (after, of course, first protecting other reactive parts of the molecule if present) with an ethynylating agent such as a Grignard reagent or an alkali metal acetylide. These means are described in detail together with methods for the total synthesis of compounds of Formula II by Douglas, Graves, Hartley, Hughes, McLoughlin, Siddall and Smith in J. Chem. Soc., 1963, 6072–5094; and by H. Smith, Hughes, Douglas, Wendt, Busby, Jr., Edgren, Fisher, Foell, Gadsby, Hartley, Herbst, Jansen, Ledig, McLoughlin, McMenamin, Pattison, Phillips, Rees, Siddall, Suida, L. Smith, Tokolics and Watson in J. Chem. Soc., 1964, 4472–4492.

In carrying out the instant process the steroid of Formula II is treated with a solution of phosphorus oxychloride in dimethylformamide at elevated temperatures preferably for a short contact time, until dehydration and rearrangement is substantially complete, followed by cooling the reaction mixture to obtain on work-up the corresponding 17β-alkylgon-13-ene of Formula I. If the substrate (II) contains hydroxyl groups stable to dehydration, e.g., unconjugated hydroxyl groups, the reaction conditions will result in the formation of the corresponding formate ester of these hydroxyl groups. The temperature at which the reaction is to be carried out is high enough to provide a complete reaction in a reasonable period of time, and temperatures of above about 50° C. are usually the minimum temperatures used. There is no apparent advantage to raising the reaction temperature much above 150° C., for example, because yields and product purity tend to be adversely effected. With most substrates of Formula II, steam-bath temperatures, for example, from about 75° C. to about 100° C. appear to be especially useful. As has been mentioned, best yields are obtained in relatively short reaction periods, e.g., from about 5 to about 30 minutes and especially from about 10 to about 20 minutes, if steam-bath temperatures are used. In one convenient manner of proceeding, the steroid of Formula II is mixed with a solution of phosphorus oxychloride dissolved in about 10 parts by volume in dimethylformamide then the mixture is heated for the desired period of time, for example, on a steam-bath for about 10 to 20 minutes, during which time, usually, formation of the product of Formula I is substantially complete. The product can be recovered by any conventional means. One useful general procedure is to cool the reaction mixture, then carefully to pour it into an excess of an ice-cold solution of pyridine-water (conveniently 1:5 by volume). The mixture then may be extracted with ether and washing, drying and evaporating the separated ether leaves the product as a residue. The product of Formula I can be purified, if desired, by chromatography, for example, followed by recrystallization from a prepared solvent such as a lower alcohol, for instance, methanol.

There is nothing particularly critical about the reaction techniques used to convert the products of Formula I by the subsequent steps contemplated, by this invention, to the valuable subsequent products also contemplated by this invention. Detailed procedures for the conversions by known methods will be exemplified in detail hereinafter.

The time and temperature ranges used in carrying out the above-mentioned processes are not particularly critical and, as will be readily apparent to those skilled in the art, will be selected to carry out the reaction in a minimum of time without undue difficulty. Thus, reaction temperatures below those exemplified can be used, but then the reaction time is extended. On the other hand, reaction temperatures higher than those exemplified can be used with a concomitant decrease in reaction time, although purity of the product may be somewhat decreased.

In the product of a total synthesis which has not included a suitable resolution stage the compounds of the invention will be present as racemates. Using a convention approved by Fieser and Fieser, "Steroids," p. 336 (1959), the compounds designated as the d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

The compounds of Formula I are valuable intermediates for hormonally-active substances. Compounds of Formula I, especially those wherein R is polycarbon-(lower)alkyl are useful starting materials for products which have been found to be active in standard pharmacological tests in laboratory animals such as mice, rabbits, rats and the like, for example, progestationally and anti-androgenically. They are more active than many known compounds now used with these activities, and, in addition, possess a valuable separation of hormonal properties to a greater degree than compounds presently used with these activities. Progestationally-active substances are used in cases of infertility and more specifically, but without limitation, to delay estrus and ovulation in cattle, pigs and dogs. Anti-androgenically active compounds are administered to counter the effects due to an excess of androgen, such as the masculinization noted with methyltestosterone and similar anabolic agents and to treat some types of acne.

As will be clear to those skilled in the art, in addition to compounds designated by Formula II, the process particularly can be applied to obvious chemical equivalents thereof, but differing therefrom in the sense of having other functional groups attached to the steroid nucleus, when other such groups do not themselves interfere, or become affected by the process, unless, in exceptional instances this is a desired effect, as for example, the use of stable hydroxy substrates when it is desired that the product include the formate ester function resulting from a "Vilsmeier reaction" under the conditions of the instant process. Similarly, the substrate steroid nucleus may contain any substitutions at positions other than 13 and 16 or 17, for example, 6-methyl, and the like. Broadly stated, therefore, useful substrates would be represented by Formula IIb:

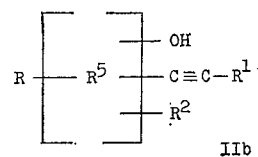

wherein

R is 13-alkyl; OH is in the 17β-position;
R¹ is hydrogen or $C_1$–$C_4$ alkyl;
R² is hydrogen or 16α- or 16β-alkyl, and
R⁵ is a cyclopentanopolyhydrophenanthrene nucleus which on elimination of 17β-hydroxyl and 14α-hydrogen and rearrangement of R from the 13- to the 17-position would provide a product unsaturated at C–13–14, and useful as intermediates for steroids with progestational and anti-androgenic activity.

DESCRIPTION OF THE PREFERRED EMBODIMENTS

The following examples are given by way of illustration and are not to be construed as limitations of the invention, variations of which are possible without departing from the scope and spirit thereof.

EXAMPLE 1

*dl*-17β-ethyl-17α-ethynyl-3-methoxygona-1,3,5(10),13-tetraene

Cool dimethylformamide (DMF) (10 ml.) with ice-bath then add phosphorus oxychloride (POCl₃) (1.5 ml.), followed by *dl*-13-ethyl-17α-ethynyl-3-methoxygona-1,3,5(10)-trien-17β-ol (0.50 g.). Heat the reaction on the steam bath for 10 minutes, cool then carefully pour the reaction into a cooled solution of pyridine (6 ml.) in water. Stir then extract with ether. Wash, dry and evaporate the extract in vacuo. Crystallize the resulting oil from methanol to get the product, M.P. 80–83° C. Further purify the sample by treatment with decolorizing charcoal in methylene chloride and crystallize from methanol. Obtain an analytical sample (from methanol) with M.P. 84–85° C., $\lambda_{max.}^{KBr}$ 3.13μ

*Analysis.*—Calcd. for $C_{22}H_{26}O$ (percent): C, 86.23; H, 8.55. Found (percent): C, 85.98; H, 8.13.

EXAMPLE 2

*dl*-17,17-diethyl-3-methoxygona 1,3,5(10),13-tetraene

Pre-treat a mixture of 5% palladium on strontium carbonate (250 mg.) and ethyl acetate (25 ml.) with hydrogen at 1 atmosphere. Then add a solution of *dl*-17β-ethyl-17α-ethynyl-3-methoxygona - 1,3,5(10),13 - tetraene (0.61 g.) in ethyl acetate (25 ml.) and continue treating with hydrogen until two molar equivalents of the gas (ca. 100 ml.) have been absorbed. Filter and evaporate the solvent in vacuo. Triturate the resulting oil with cold ethanol then filter to get 0.46 g. of the product, M.P. 47–50° C. Obtain an analytical sample from methanol, M.P. 47–49° C.

*Analysis.*—Calcd. for $C_{22}H_{30}O$ (percent): C, 85.11; H, 9.74. Found (percent): C, 84.93; H, 9.51.

EXAMPLE 3 dl-17β-ethyl-17α-ethynylgona-5,13-dien-3β-ol, acetate

Cool DMF (200 ml.) in an ice-bath then add POCl₃ (30 ml.) dropwise with stirring. Add *dl*-13-ethyl-17α-ethynylgon-5-en-3β-17β-diol, 3-acetate (10.0 g.) and heat the reaction on the steam bath for 20 minutes. Cool to room temperature then pour the reaction into an ice-cold solution of pyridine (200 ml.) in water (1000 ml.). Stir for 1 hour then extract the mixture with ether. Wash, dry and evaporate the solvent in vacuo. Dissolve the resulting oil in benzene and pass the solution through a column of fluosilicate. Remove the benzene in vacuo and treat the product with decolorizing charcoal in methylene chloride. Flter, evaporate the solvent in vacuo and crystallize the resulting oil from methanol to get 2.45 g. of the product, M.P. 95–97° C., $\lambda_{max.}^{KBr}$ 3,12 and 5.78μ

*Analysis.*—Calcd. for $C_{23}H_{30}O_2$ (percent): C, 81.61; H, 8.93. Found (percent): C, 81.43; H, 8.58.

EXAMPLE 4

*dl*-17β-ethyl-17α-ethynylgona-5,13-dien-3β-ol

To a solution of potassium hydroxide (0.60 g.) in methanol (50 ml.) add *dl*-17β-ethyl-17α-ethynylgona-5,13-dien-3β-ol, acetate (1.70 g.) and reflux for 15 minutes. Cool and stir at room temperature for ½ hour. Add water (200 ml.) dropwise and with stirring. Extract the mixture with ether then wash dry and evaporate the extract in vacuo. Treat the residue in methylene chloride with decolorizing charcoal, filter then crystallize from hexane-ether to get 0.94 g. of the pure product, M.P. 122–124° C.;

$\lambda_{max.}^{KBr}$ 3.1μ

*Analysis.*—Calcd. for $C_{21}H_{28}O$ (percent): C, 85.08; H, 9.52. Found (percent): C, 84.87; H, 9.44.

EXAMPLE 5

*dl*-17β-ethyl-17α-ethynylgona-4,13-dien-3-one

Reflux a mixture of benzene (300 ml.), methyl ethyl ketone (60 ml.) and *dl*-17β-ethyl-17α-ethynylgona-5,13-dien-3β-ol (4.30 g.) under nitrogen into a water separator for 15 minutes and remove 15 ml. of distillate. Then add aluminum isopropoxide (4.5 g.) and continue refluxing for 2½ hours. Cool and add water (200 ml.), stir then add dilute hydrochloric acid to pH 5. Extract the mixture with ether then wash dry and evaporate the extract in vacuo. Dissolve the resulting oil in methanol and filter. Remove the methanol in vacuo then dissolve the oil in benzene and pass the solution through a column of neutral anhydrous alumina. Remove the benzene in vacuo. Treat the oil in methylene chloride with decolorizing charcoal, filter and evaporate in vacuo. Crystallize from hexane to get 1.38 g. of the pure product, M.P. 64–66° C., $\lambda_{max.}^{KBr}$ 3.09, 4.80 and 6.03μ, $\lambda_{max.}^{EtOH}$ 239 mμ (16,600)

*Analysis.*—Calcd. for $C_{21}H_{26}O$ (percent): C, 85.66; H, 8.90. Found (percent): C, 85.77; H, 8.73.

EXAMPLE 6

*dl*-17β-ethyl-17α-ethynyl-5β-methylgon-13-en-3-one

Add 3 molar ethereal methyl magnesium bromide (40 ml.) to dry tetrahydrofuran (250 ml.) under nitrogen. Cool the solution in a methanolic-ice water bath then add cuprous chloride (10.0 g.) stir for 5 minutes then add a solution of *dl*-17β-ethyl-17α-ethynylgona-4,13-dien-3-one (3.00 g.) in dry tetrahydrofuran (50 ml.) dropwise. Stir the cold reaction under nitrogen for ½ hour, then remove the ice-bath and stir at room temperature a further 1 hour. Again cool the reaction as above and add saturated ammonium chloride solution (300 ml.) dropwise. Filter the reaction and extract with ether. Wash, dry and evaporate the extract in vacuo. Dissolve the resulting oil in methanol, filter and scratch to induce crystallization. Filter to obtain 0.80 g. of product, M.P. 98–99° C. Obtain an analytical sample from methanol M.P. 106–108° C., $\lambda_{max.}^{KBr}$ 3.08, 4.78 and 5.87μ

*Analysis.*—Calcd. for $C_{22}H_{30}O$ (percent): C, 85.11; H, 974. Found (percent): C, 84.82; H, 9.46.

EXAMPLE 7

The procedure of Example 1 is repeated, substituting for the *dl*-13-ethyl-17α-ethynyl-3-methoxygona-1,3,5(10)- trien-17β-ol, equivalent amounts of the following substrates:

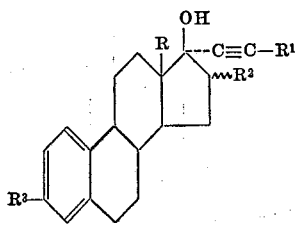

| No. | R | R¹ | R² | R³ |
|---|---|---|---|---|
| 1 | $CH_3$ | H | H | OH |
| 2 | $CH_3CH_2$ | $CH_3$ | H | OH |
| 3 | $CH_3CH_2$ | $CH_3(CH_2)_2CH_2$ | H | OH |
| 4 | $CH_3(CH_2)_4CH_2$ | H | H | OH |
| 5 | $CH_3CH_2$ | H | α-$CH_3$ | OH |
| 6 | $CH_3CH_2$ | H | β-$CH_3$ | OH |
| 7 | $CH_3CH_2$ | H | α-$CH_3(CH_2)_4CH_2$ | OH |
| 8 | $CH_3CH_2$ | H | β-$CH_3(CH_2)_4CH_2$ | OH |
| 9 | $CH_3CH_2$ | H | H | H |
| 10 | $CH_3CH_2$ | H | H | $OCOCH_3$ |

There are obtained (after hydrolyzing the 3-formyloxy intermediates in Nos. 1–8) the following products:

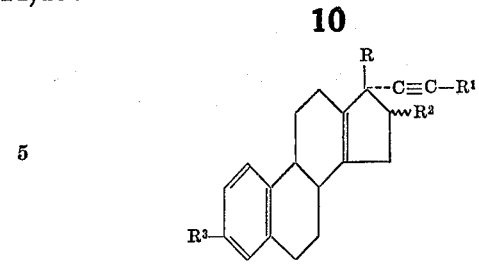

| No. | R | R¹ | R² | R³ |
|---|---|---|---|---|
| 1 | $CH_3$ | H | H | OH |
| 2 | $CH_3CH_2$ | $CH_3$ | H | OH |
| 3 | $CH_3CH_2$ | $CH_3(CH_2)_2CH_2$ | H | OH |
| 4 | $CH_3(CH_2)_4CH_2$ | H | H | OH |
| 5 | $CH_3CH_2$ | H | α-$CH_3$ | OH |
| 6 | $CH_3CH_2$ | H | β-$CH_3$ | OH |
| 7 | $CH_3CH_2$ | H | α-$CH_3(CH_2)_4CH_2$ | OH |
| 8 | $CH_3CH_2$ | H | β-$CH_3(CH_2)_4CH_2$ | OH |
| 9 | $CH_3CH_2$ | H | H | H |
| 10 | $CH_3CH_2$ | H | H | $OCOCH_3$ |

The hydrolysis is carried out by dissolving KOH in methanol, adding 3 parts of steroid/part of KOH (the steroid goes into solution, which becomes clear), stirring for one hour at 23° C., adding water to precipitate the product and filtering off, then recrystallizing.

EXAMPLE 8

The procedure of Example 3 is repeated, substituting for the dl-13-ethyl-17α-ethynylgon-5-en-3β,17β-diol, 3-acetate, equivalent amounts of the following substrates:

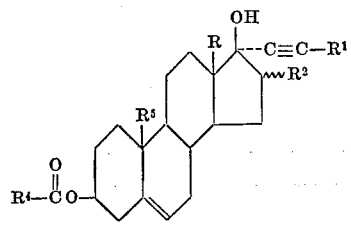

| R | R¹ | R² | R⁴ | R⁵ |
|---|---|---|---|---|
| $CH_3(CH_2)_4CH_2$ | H | H | $CH_3$ | H |
| $CH_3$ | H | H | $CH_3$ | H |
| $CH_2CH_3$ | $CH_3$ | H | $CH_3$ | H |
| $CH_2CH_3$ | H | H | $CH_3(CH_2)_4CH_2$ | H |
| $CH_2CH_3$ | $CH_3(CH_2)_2CH_2$ | H | $CH_3$ | H |
| $CH_2CH_3$ | H | α-$CH_3$ | $CH_3$ | H |
| $CH_2CH_3$ | H | β-$CH_3$ | $CH_3$ | H |
| $CH_3CH_2$ | H | α-$CH_3(CH_2)_4CH_2$ | $CH_3$ | H |
| $CH_3CH_2$ | H | β-$CH_3(CH_2)_4CH_2$ | $CH_3$ | H |
| $CH_3CH_2$ | H | H | $CH_3$ | $CH_3$ |

There are obtained the following products:

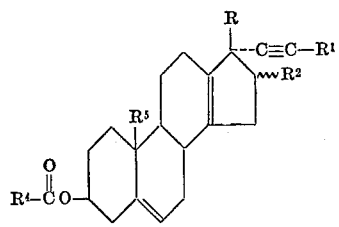

| R | R¹ | R² | R⁴ | R⁵ |
|---|---|---|---|---|
| $CH_3(CH_2)_4CH_2$ | H | H | $CH_3$ | H |
| $CH_3$ | H | H | $CH_3$ | H |
| $CH_2CH_3$ | $CH_3$ | H | $CH_3$ | H |
| $CH_2CH_3$ | H | H | $CH_3(CH_2)_4CH_2$ | H |
| $CH_2CH_3$ | $CH_3(CH_2)_2CH_2$ | H | $CH_3$ | H |
| $CH_2CH_3$ | H | α-$CH_3$ | $CH_3$ | H |
| $CH_2CH_3$ | H | β-$CH_3$ | $CH_3$ | H |
| $CH_3CH_2$ | H | α-$CH_3(CH_2)_4CH_2$ | $CH_3$ | H |
| $CH_3CH_2$ | H | β-$CH_3(CH_2)_4CH_2$ | $CH_3$ | H |
| $CH_3CH_2$ | H | H | $CH_3$ | $CH_3$ |

EXAMPLE 9

The procedure of Example 5 is repeated substituting for dl-17β-ethyl-17α-ethynylgona-5,13-dien-3β-ol, the following substrates:

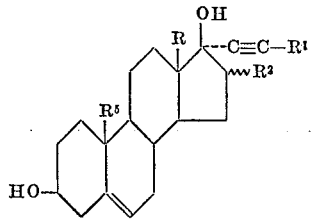

| R | R¹ | R² | R⁵ |
|---|---|---|---|
| CH₃(CH₂)₄CH₂ | H | H | H |
| CH₃ | H | H | H |
| CH₂CH₃ | CH₃ | H | H |
| CH₂CH₃ | CH₃(CH₂)₄CH₂ | H | H |
| CH₂CH₃ | H | α-CH₃ | H |
| CH₂CH₃ | H | β-CH₃ | H |
| CH₂CH₃ | H | α-CH₃(CH₂)₄CH₂ | H |
| CH₂CH₃ | H | β-CH₃(CH₂)₄CH₂ | H |
| CH₂CH₃ | H | H | CH₃ |

The following are obtained:

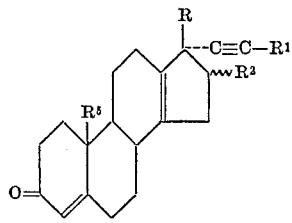

| R | R¹ | R² | R⁵ |
|---|---|---|---|
| CH₃(CH₂)₄CH₂ | H | H | H |
| CH₃ | H | H | H |
| CH₂CH₃ | CH₃ | H | H |
| CH₂CH₃ | CH₃(CH₂)₄CH₂ | H | H |
| CH₂CH₃ | H | α-CH₃ | H |
| CH₂CH₃ | H | β-CH₃ | H |
| CH₂CH₃ | H | α-CH₃(CH₂)₄CH₂ | H |
| CH₂CH₃ | H | β-CH₃(CH₂)₄CH₂ | H |
| CH₂CH₃ | H | H | CH₃ |

EXAMPLE 10

The procedure of Example 6 is repeated, substituting for dl - 17β - ethyl-17α-ethynylgona-4,13-dien-3-one, the products of Example 9 and the following are obtained:

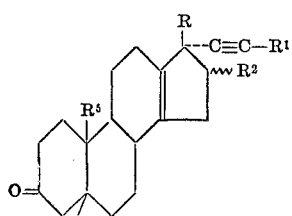

| R | R¹ | R² | R⁵ |
|---|---|---|---|
| CH₃(CH₂)₄CH₂ | H | H | H |
| CH₃ | H | H | H |
| CH₂CH₃ | CH₃ | H | H |
| CH₂CH₃ | CH₃(CH₂)₄CH₂ | H | H |
| CH₂CH₃ | H | α-CH₃ | H |
| CH₂CH₃ | H | β-CH₃ | H |
| CH₂CH₃ | H | α-CH₃(CH₂)₄CH₂ | H |
| CH₂CH₃ | H | β-CH₃(CH₂)₄CH₂ | H |
| CH₂CH₃ | H | H | CH₃ |

EXAMPLE 11

The procedure of Example 2 is repeated substituting for dl - 17β - ethyl-17α-ethynyl-3-methoxygona-1,3,5(10),13-tetraene, the following compounds:

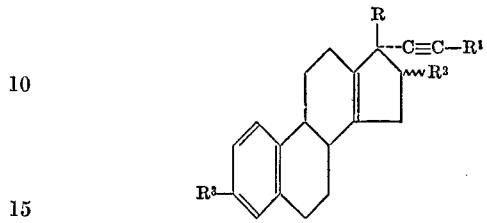

| No. | R | R¹ | R² | R³ |
|---|---|---|---|---|
| 1 | CH₃ | H | H | OH |
| 2 | CH₃CH₂ | CH₃ | H | OH |
| 3 | CH₃CH₂ | CH₃(CH₂)₂CH₂ | H | OH |
| 4 | CH₃(CH₂)₄CH₂ | H | H | OH |
| 5 | CH₃CH₂ | H | α-CH₃ | OH |
| 6 | CH₃CH₂ | H | β-CH₃ | OH |
| 7 | CH₃CH₂ | H | α-CH₃(CH₂)₄CH₂ | OH |
| 8 | CH₃CH₂ | H | β-CH₃(CH₂)₄CH₂ | OH |
| 9 | CH₃CH₂ | H | H | H |
| 10 | CH₃CH₂ | H | H | OCOCH₃ |

There are obtained

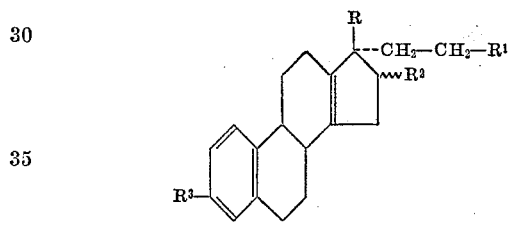

| No. | R | R¹ | R² | R³ |
|---|---|---|---|---|
| 1 | CH₃ | H | H | OH |
| 2 | CH₃CH₂ | CH₃ | H | OH |
| 3 | CH₃CH₂ | CH₃(CH₂)₂CH₂ | H | OH |
| 4 | CH₃(CH₂)₄CH₂ | H | H | OH |
| 5 | CH₃CH₂ | H | α-CH₃ | OH |
| 6 | CH₃CH₂ | H | β-CH₃ | OH |
| 7 | CH₃CH₂ | H | α-CH₃(CH₂)₄CH₂ | OH |
| 8 | CH₃CH₂ | H | β-CH₃(CH₂)₄CH₂ | OH |
| 9 | CH₃CH₂ | H | H | H |
| 10 | CH₃CH₂ | H | H | OCOCH₃ |

We claim:
1. A process for the preparation of a compound of the 17α - (lower)alkynyl - 17β - (lower)alkylgon - 13 - ene series which comprises heating the corresponding 17-α-(lower)alkynyl - 13β - (lower)alkylgonan - 17β - ol with a solution of phosphorus oxychloride in dimethylformamide until formation of said gon-13-ene is substantially complete.

2. A process as defined in claim 1, wherein said heating is carried out at a temperature from about 75° C. to about 100° C. for from about 5 to about 30 minutes.

3. A process as defined in claim 1, wherein said gon-13-ene is of the formula:

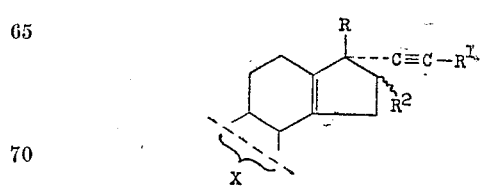

wherein

R is (lower)alkyl;
R¹ is hydrogen or alkyl of from 1 to 4 carbon atoms;

$R^2$ is hydrogen or (lower)alkyl;
X is a divalent radical selected from

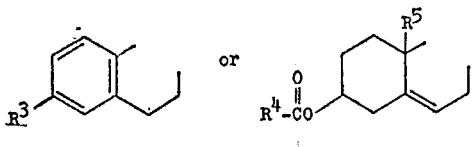

wherein $R^3$ is hydrogen, (lower)alkoxy or (lower)alkanoyloxy and
$R^4$ is (lower)alkyl;
$R^5$ is hydrogen or methyl; and
the symbol (⁝) designates α- or β-configuration; and wherein said gonan-17β-ol is of the formula:

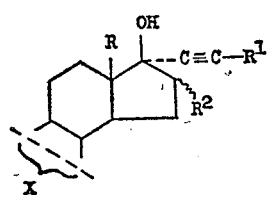

wherein R, $R^1$, $R^2$ and X are as hereinabove defined.

4. A process as defined in claim 3, wherein dl-17β-ethyl - 17α - ethynyl - 3 - methoxygona - 1,3,5(10),13-tetraene is prepared from dl - 13 - ethyl - 17α - ethynyl-3-methoxygona-1,3,5(10)-triene-17β-ol.

5. A process as defined in claim 1, wherein dl-17β-ethyl- 17α - ethynylgona - 5,13 - dien - 3β - ol, acetate is prepared from dl - 13 - ethyl - 17α - ethynylgon - 5 - en-3β,17β-diol, 3-acetate.

6. A process as defined in claim 1, including the step of catalytically hydrogenating said 17α-(lower)alkynylgon-13-ene to produce the corresponding 17α-(lower)alkenyl- or -(lower)alkylgon-13-ene.

7. A process as defined in claim 6, wherein dl - 17,17-diethyl - 3 - methoxygona - 1,3,5(10),13 - tetraene is produced from dl-17β-ethyl - 17α - ethynyl - 3 - methoxygona-1,3,5(10),13-tetraene.

8. A process as defined in claim 1, including the step of hydrolyzing in the presence of base the ester function in a 3 - (lower)alkanoyloxygon - 5,13 - diene or a 3-formyloxygona - 1,3,5(10),13 - tetraene to produce the corresponding 3-ol compound.

9. A process as defined in claim 8, wherein dl-17β-ethyl-17α - ethynylgona - 5,13 - diene - 3β - ol is produced by heating dl - 17β - ethyl - 17α - ethynylgona - 5,13-diene-3β-ol, acetate with potassium hydroxide in methanol.

10. A process as defined in claim 8, including the step of oxidizing said 3-ol to produce a compound of the 17β - (lower)alkyl - 17α - (lower)alkynyl - ((or -vinyl or -(lower)alkyl))gona-4,13-diene-3-one series.

11. A process as defined in claim 10, wherein dl-17β-ethyl - 17α - ethynylgona - 4,13 - dien - 3 - one is produced by heating dl - 17β - ethyl - 17α - ethynylgona - 5,13-dien-3β-ol with aluminum isopropoxide and a ketone.

12. A process as defined in claim 10, including the step of reacting said gona - 4,13 - dien - 3 - one with methyl magnesium chloride, bromide or iodide to produce the corresponding 5-methylgon-13-en-3-one.

13. A process as defined in claim 12, wherein dl-17β-ethyl - 17α - ethynyl - 5β - methylgon - 13 - en - 3 - one is produced by reacting dl - 17β - ethyl - 17α - ethynylgona-4,13-diene-3-one with methyl magnesium bromide.

14. A compound of the formula

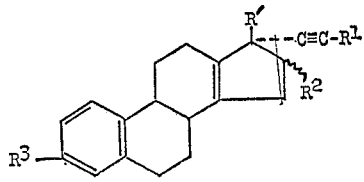

wherein

R' is polycarbon(lower)alkyl;
$R^1$ is hydrogen or alkyl of from 1 to 4 carbon atoms;
$R^2$ is hydrogen or (lower)alkyl; and
$R^3$ is hydrogen, hydroxy, (lower)alkoxy or (lower)alkanoyloxy; and
the symbol (⁝) designates α- or β-configuration.

15. A compound as defined in claim 14, which is dl-17β - ethyl - 17α - ethynyl - 3 - methoxygona - 1,3,5(10), 13-tetraene.

16. A compound of the formula

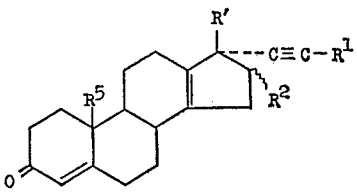

wherein

R' is polycarbon(lower)alkyl;
$R^1$ is hydrogen or alkyl of from 1 to 4 carbon atoms;
$R^2$ is hydrogen or (lower)alkyl;
$R^5$ is hydrogen or methyl; and
the symbol (⁝) designates α- or β-configuration.

17. A compound as defined in claim 16, which is dl-17β-ethyl-17α-ethynylgona-4,13-dien-3-one.

18. A compound of the formula

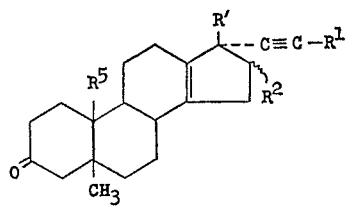

wherein

R' is polycarbon(lower)alkyl;
$R^1$ is hydrogen or alkyl of from 1 to 4 carbon atoms;
$R^2$ is hydrogen or (lower)alkyl;
$R^5$ is hydrogen or methyl; and
the symbol (⁝) designates α- or β-configuration.

19. A compound as defined in claim 18, which is dl-17β-ethyl-17α-ethynyl-5β-methylgon-13-en-3-one.

20. A compound of the formula

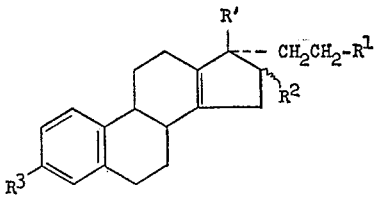

wherein

R' is polycarbon(lower)alkyl;
$R^1$ is hydrogen or alkyl of from 1 to 4 carbon atoms;
$R^2$ is hydrogen or (lower)alkyl;
$R^3$ is hydrogen, hydroxy, (lower)alkoxy or (lower)alkanoyloxy; and the
symbol (⁝) designates α- or β-configuration.

21. A compound as defined in claim 20, which is dl-17,17-diethyl-3-methoxygona-1,3,5(10),13-tetraene.

References Cited

UNITED STATES PATENTS 3,483,232  12/1969  Dusza et al. _____ 260—397.1

HENRY A. FRENCH, Primary Examiner

U.S. Cl. X.R.

260—397, 397.5, 999